Patented Jan. 1, 1929.

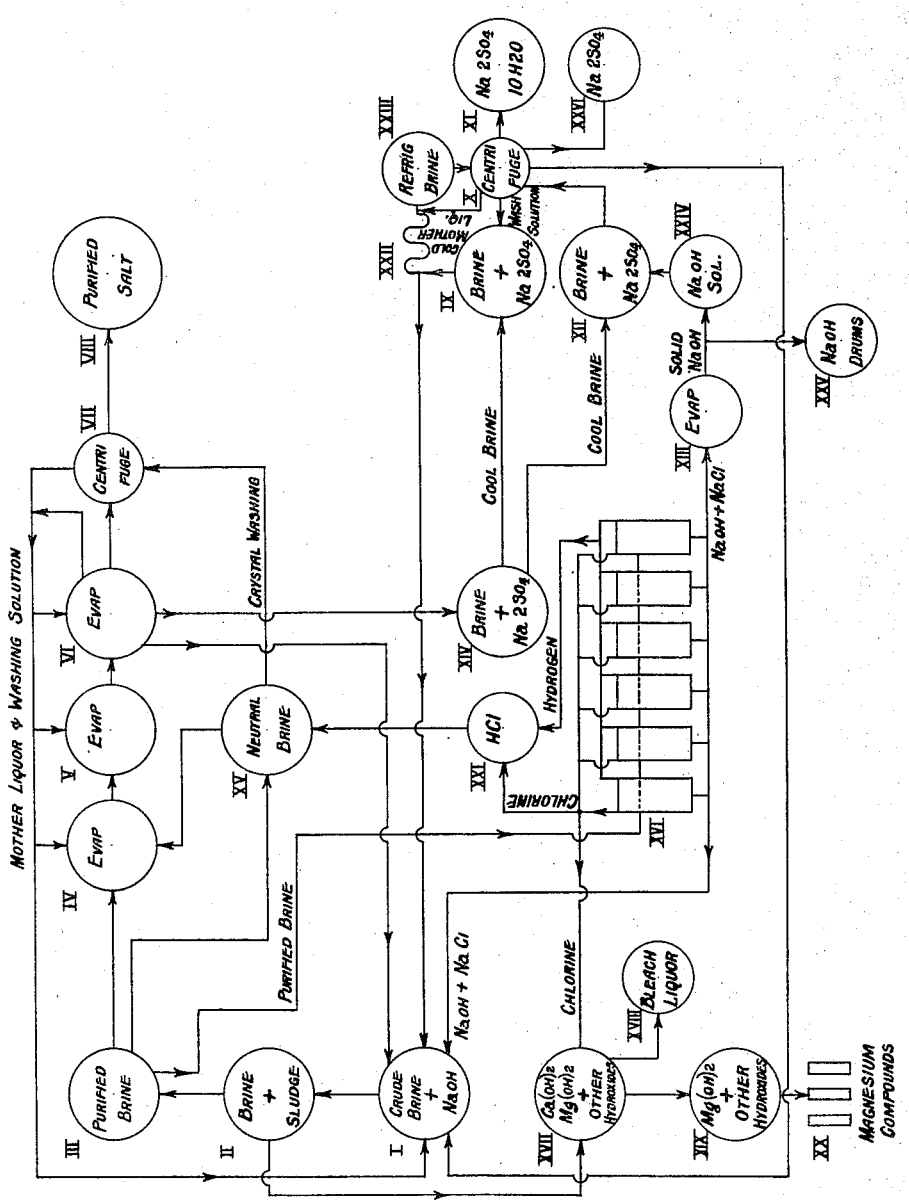

1,697,336

UNITED STATES PATENT OFFICE.

VICTOR YNGVE, OF SOUTH ORANGE, NEW JERSEY.

METHOD OF PURIFYING SALT AND RECOVERING BY-PRODUCTS.

Application filed April 9, 1925. Serial No. 21,844.

The present invention relates to new and useful improvements in methods of purifying salt and of recovering and utilizing certain by-products.

The process will be described as a complete cycle, though it will be obvious to those skilled in the art that certain processes have a much wider application and may be used entirely apart from other processes. This invention utilizes some of the principles described in my Patent No. 1,520,920 and is in part an extension of that invention.

The starting point of the process involved in the present invention is brine, which may be of any suitable concentration but preferably contains about 300 grams of sodium chloride per liter. The brine may be natural or artificial, made from any available commercial grade of salt and may be subjected to pretreatment. A typical brine which may be used, though it is not to be considered in a limiting sense, is the following:

|  | Grams per liter. |
|---|---|
| Sodium | 114.0 |
| Chlorine | 174.2 |
| Magnesium | .8 |
| Calcium | 1.4 |
| Sulphur trioxide | 3.2 |

The process is best explained by means of the attached drawing, though it is understood that variations in the procedure will occur to those skilled in the art without departing from the spirit of the invention.

The crude brine is treated in container I with sodium hydroxide. The sodium hydroxide can be added in any suitable manner, but preferably the main portion of it is added just as it comes from XVI, caustic-chlorine cells, and salt is also present in the caustic solution. Sodium hydroxide is also added from other parts of the process as will be disclosed later. The sodium hydroxide is added in excess of the amount to precipitate the magnesium and calcium present in the brine. The amount may vary from a fraction of one per cent to five per cent or more, but preferably about 10 grams per liter is added. The mixture is preferably heated to about 100° C. and the sludge of hydroxides is filtered off or allowed to settle in II. The clear brine is stored in III from which it goes to evaporators IV, V and VI.

In the evaporators the brine is concentrated and salt separates out. Sodium hydroxide and sodium sulphate become concentrated in the mother liquor. When the sodium hydroxide concentration reaches a suitable percentage, which may be for instance, from one to ten per cent, part of the mother liquor may be withdrawn from the evaporators and added, as indicated, to I, where it purifies more brine. The exact percentage of the NaOH in the mother liquor may be varied to suit operating conditions. Meanwhile, the sodium sulphate becomes more concentrated and is removed in a manner to be hereinafter set forth. The purified salt and adhering mother liquor passes to centrifuge VII, where the mother liquor is separated and the salt is washed either with purified neutral brine from XV or by any other suitable method. The neutral brine in XV is obtained by neutralizing brine from III with hydrochloric acid which may be made as indicated from hydrogen and chlorine from the chlorine-caustic cells XVI. This neutral brine may, if preferred, be used in the evaporators IV, V and VI as indicated. The washing solution may go back to the evaporators.

When the sodium sulphate concentration has become sufficiently high in the mother liquor it is removed by the following procedure: Mother liquor is taken from the evaporators and stored in XIV where it is cooled to about 20° C. This separates out some sodium chloride. The clear solution then passes through the precooling coil or tank XXII and to the tank or coil XXIII, where the solution is finally refrigerated to a temperature suitable for separating out the hydrated sodium sulphate. A temperature of about 0° C. is preferred though higher or lower temperatures may be used. The percentage of sodium sulphate deca-hydrate which separates out depends on the percentage of sodium hydroxide in the brine. With a brine carrying 3% NaOH 6% to 9% of the deca-hydrate may be recovered. With the NaOH concentration higher less sodium sulphate is held in the brine and with the concentration lower, more is held in the brine. The refrigerating systems XXII and XXIII may be provided with suitable stirrers and scrapers to keep the crystals from adhering to the sides of the systems. I have found that these solutions tend readily to supersaturate with respect to sodium sulphate and I prefer to allow this to take place in the precooling coil XXII and seed the cold solution in XXIII with the hydrated sodium sulphate. This procedure allows most of the cooling to be done in a simple precooling coil without scrapers for the sides of the tube. The sodium sulphate deca-hydrate is separated from the cold brine by the centrifuge X or other suitable means, and the cold brine goes to the precooler where it cools the incoming brine. From there it may go to I, as indicated. The wash water may go back, as indicated, to IX.

The brine from XIV may also go to XII where it is treated with a solution of sodium hydroxide obtained from the cells XVI through XIII and XXIV, which separates out sodium sulphate either hydrated or anhydrous, depending on the temperature and composition of the solution in which it is precipitated. The sodium sulphate is separated by the centrifuge X and the mother liquor, containing an excess of sodium hydroxide, goes back to I to purify more brine.

The mixture of calcium hydroxide, magnesium hydroxide and other hydroxides in XVII is treated with chlorine, preferably direct from the cells XVI, either before the sludge is washed or after washing. This sludge will usually contain comparatively large amounts of magnesium hydroxide. Such percentages may be 10 to 20% or even higher. I have found that an excellent bleach liquor can be made from this sludge if the chlorination is stopped before the magnesium hydroxide is chlorinated. If the chlorination is carried too far, large percentages of chlorates are formed. It has always been considered that large percentages of magnesium hydroxide in a bleach sludge rendered the sludge useless for bleach liquor, but I have discovered that it need not be detrimental if the chlorination is not carried too far. The magnesium hydroxide remaining may be converted into various magnesium compounds or mixtures.

The present method of obtaining sodium sulphate may be used in conjunction with any other salt manufacturing process in which calcium is removed from the brine which, in the present case, occurs when the brine is treated with sodium hydroxide.

What I claim is:

1. The process of purifying salt and obtaining sodium sulphate which consists in treating brine with an excess of sodium hydroxide obtained from caustic chlorine cells separating out the resultant sludge, conducting portions of the purified brine to the chlorine cells, evaporating the balance of the purified brine to obtain purified salt, recirculating portions of the resultant mother liquor when the sodium hydroxide concentration reaches a certain percentage to purify more brine, cooling portions of the mother liquor, and recovering sodium sulphate therefrom.

2. The process of purifying salt which consists in treating a brine with an excess of an alkali, removing the hydroxides which are precipitated, evaporating the purified brine, recovering salt therefrom, using the mother liquor for treating more brine in a cyclic process, and washing the precipitated salt with a neutral brine.

3. The process of obtaining sodium sulphate which consists in removing calcium from a salt brine, and concentrating and recovering the sodium sulphate contained therein.

4. The process of obtaining sodium sulphate as a by-product in the manufacture of salt which consists in removing calcium from a salt brine, allowing sodium sulphate to become concentrated in the brine, cooling portions of the mother liquor to cause sodium sulphate to separate out, and using the cold mother liquor to precool other portions of brine.

5. The process of obtaining sodium sulphate from a brine which consists in cooling the brine to about 20° C., separating out the precipitated salt, cooling the solution to about 0° C., and separating out the hydrated sodium sulphate.

6. The process of obtaining sodium sulphate from a brine which consists in cooling the brine to about 20° C., separating out the precipitated salt, cooling the solution to about 0° C., separating out the hydrated sodium sulphate, and using the cold mother liquor to precool another portion of brine to become supersaturated with sodium sulphate.

7. The process of obtaining sodium sulphate from a brine which comprises first removing from the brine magnesium and calcium and then treating the brine with sodium hydroxide to precipitate sodium sulphate.

8. The process of obtaining sodium sulphate from a brine which consists in treating the brine with sodium hydroxide to precipitate sodium sulphate, separating the sodium sulphate and using the mother liquor to purify an impure salt brine.

9. The process of purifying salt which consists in treating a brine with an excess of sodium hydroxide, removing the hydroxides which are precipitated, evaporating the purified brine, recovering salt therefrom, using the mother liquor with removal of sodium sulphate for treating more brine in a cyclic process, and washing the precipitated salt with a neutral brine.

10. The process of obtaining sodium sulphate from a brine which consists in cooling the brine to about 20° C., separating out the precipitated salt, cooling the solution to about 0° C., separating out the hydrated sodium sulphate, using the cold mother liquor to precool another portion of brine, and allowing the brine to become supersaturated with sodium sulphate.

In testimony whereof I have signed my name to this specification, this 8th day of April, 1925.

VICTOR YNGVE.